United States Patent
Suzuki et al.

(10) Patent No.: US 11,372,238 B2
(45) Date of Patent: Jun. 28, 2022

(54) MIRROR UNIT

(71) Applicant: HAMAMATSU PHOTONICS K.K., Hamamatsu (JP)

(72) Inventors: Daiki Suzuki, Hamamatsu (JP); Tomoyuki Ide, Hamamatsu (JP); Yuki Morinaga, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 109 days.

(21) Appl. No.: 16/775,467

(22) Filed: Jan. 29, 2020

(65) Prior Publication Data
US 2020/0249470 A1 Aug. 6, 2020

(30) Foreign Application Priority Data

Jan. 30, 2019 (JP) .............................. JP2019-014610
Jan. 28, 2020 (JP) .............................. JP2020-011754

(51) Int. Cl.
*G02B 26/08* (2006.01)
*G02B 26/10* (2006.01)
*G02B 5/08* (2006.01)

(52) U.S. Cl.
CPC .............. *G02B 26/105* (2013.01); *G02B 5/08* (2013.01)

(58) Field of Classification Search
CPC ............ G02B 27/0031; G02B 26/0833; G02B 26/10; G02B 26/101; G02B 27/0006; G02B 26/085; G02B 26/105; G02B 26/08
See application file for complete search history.

(56) References Cited

U.S. PATENT DOCUMENTS

| 10,459,218 B2 | 10/2019 | Suzuki et al. | |
| 2007/0024549 A1* | 2/2007 | Choi | B81B 7/0067 345/84 |
| 2010/0014147 A1 | 1/2010 | Pinter et al. | |

FOREIGN PATENT DOCUMENTS

| JP | 2017-215352 A | 12/2017 |
| JP | 2018-017859 A | 2/2018 |

OTHER PUBLICATIONS

Kousuke Ushiro et al., "Development and Verification for Next Generation System of Surrounding Environment Recognition Technology—Third Report: System Architecture of MEMS Scanning 3D Range Sensor-", JARI Research Journal Nov. 3, 2017, pp. 1-6, Jan. 9, 2019 search (with partial translation).
Hamamatsu Photonics K.K., "Product Flyer KSX-I50123G-E".

\* cited by examiner

*Primary Examiner* — Euncha P Cherry
(74) *Attorney, Agent, or Firm* — Faegre Drinker Biddle & Reath LLP

(57) ABSTRACT

In a mirror unit, a first wall portion is higher than a second wall portion. A window member is disposed on a top surface of the first wall portion and a top surface of the second wall portion and is inclined with respect to a mirror surface. When any one of first to fourth wall portions is set as a first reference wall portion, in a cross-section perpendicular to the first reference wall portion, a first line passing through a first end at a side of the first reference wall portion in the mirror surface and a first corner portion formed at the side of the first reference wall portion by an outer surface and a first side surface in the window member intersects the first wall portion. A wiring portion includes a portion extending inside a base and leads outside a frame member.

9 Claims, 6 Drawing Sheets

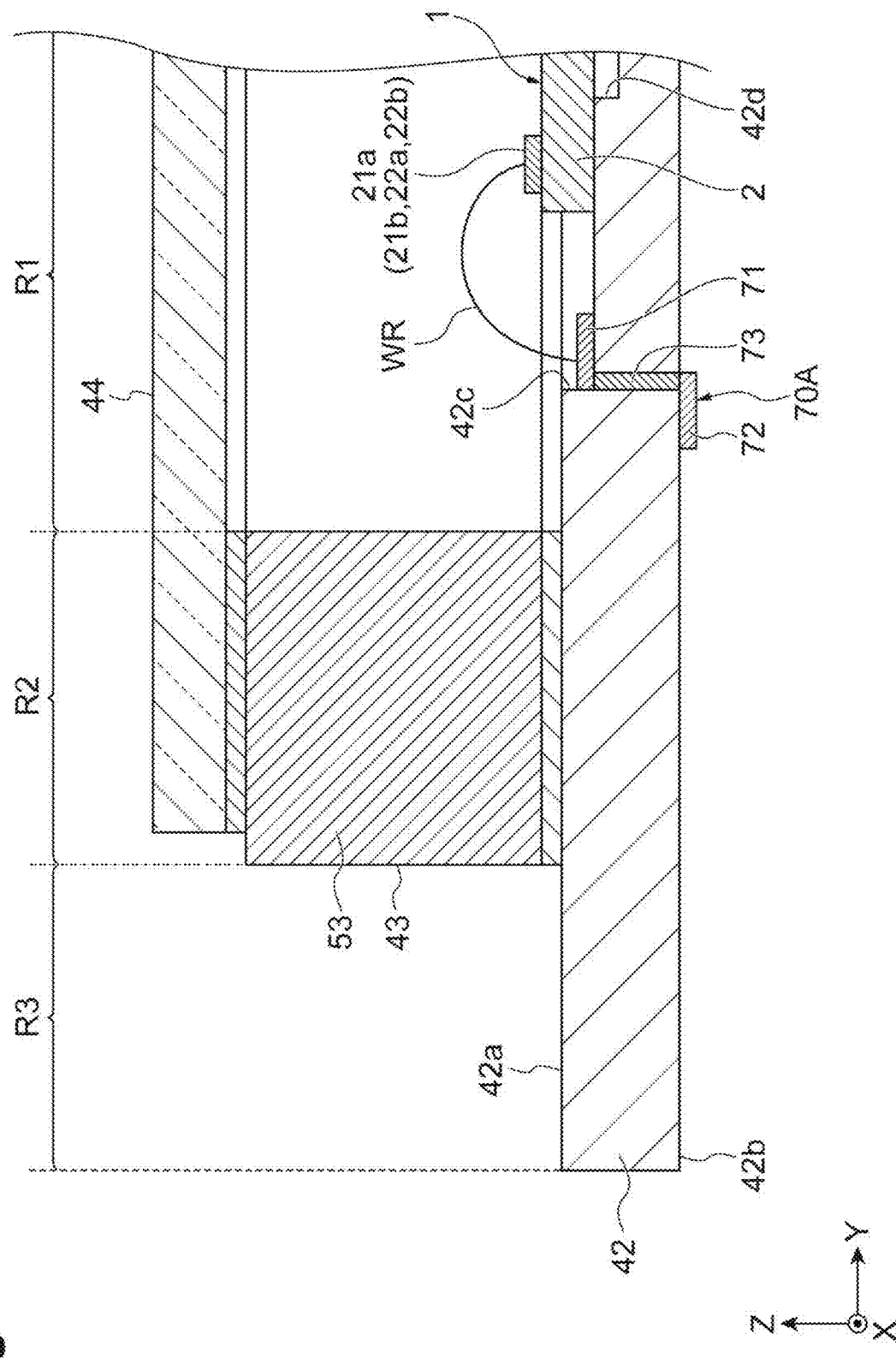

MIRROR UNIT

TECHNICAL FIELD

An aspect of the present disclosure relates to a mirror unit.

BACKGROUND

Japanese Unexamined Patent Publication No. 2017-215352 discloses a mirror unit including an optical scanning device having a mirror surface provided on a movable portion, a frame member disposed so as to surround the optical scanning device, and a flat window member covering an opening of the frame member. Light is incident to the mirror surface through the window member from the outside, is reflected by the mirror surface, and is emitted to the outside through the window member.

SUMMARY

In the mirror unit described in Japanese Unexamined Patent Publication No. 2017-215352, a height of one of a pair of wall portions constituting the frame member and facing each other is formed to be higher than the other and the window member disposed on the frame member is inclined with respect to the mirror surface. When the window member is inclined with respect to the mirror surface, the traveling direction of the light reflected by the window member can be different from the traveling direction of the light reflected by the mirror surface and the light reflected by the window member can be prevented from to be noise light.

Meanwhile, in the configuration in which optical scanning is performed by swinging the movable portion provided with the mirror surface as in the mirror unit, the light incident angle to the window member increases in accordance with the angle of the mirror surface and the refraction angle of the light emitted from the window member increases. Particularly, in the above-described configuration in which the window member is inclined, the light incident angle to the window member further increases. For that reason, it is necessary to consider the influence of refraction at the window member in order to realize high-accuracy optical scanning. Here, it is conceivable to restrain the influence of refraction at the window member by thinning the window member to reduce the refraction amount at the window member. However, when the window member is formed to be thin, the strength of the window member decreases and the window member is likely to be broken. For that reason, it is required to prevent the damage of the window member. Further, it is also required to improve reliability in the above-described mirror unit.

An object of an aspect of the present disclosure is to provide a mirror unit capable of preventing damage of a window member while reducing noise light and improving reliability.

A mirror unit according to an aspect of the present disclosure includes: a base; an optical scanning device that includes a movable portion and a mirror surface provided on the movable portion and is disposed on the base; a frame member disposed on the base so as to surround the optical scanning device when viewed from a first direction; a window member formed in a plate shape and disposed on the frame member so as to cover an opening of the frame member; and a wiring portion electrically connected to the optical scanning device, in which the frame member includes a first wall portion and a second wall portion which face each other in a second direction perpendicular to the first direction and a third wall portion and a fourth wall portion which face each other in a third direction perpendicular to both the first direction and the second direction, in which a height of the first wall portion is higher than a height of the second wall portion, in which the window member is disposed on a top surface of the first wall portion and a top surface of the second wall portion and is inclined with respect to the mirror surface, in which when any one of the first wall portion, the second wall portion, the third wall portion, and the fourth wall portion is set as a first reference wall portion, in a cross-section passing through the mirror surface and perpendicular to the first reference wall portion, a first line passing through a first end at a side of the first reference wall portion in the mirror surface and a first corner portion formed at the side of the first reference wall portion by an outer surface opposite to the frame member and a first side surface in the window member intersects the first reference wall portion, and in which the wiring portion includes a portion extending inside the base and leads outside the frame member.

In the mirror unit, the height of the first wall portion is higher than the height of the second wall portion and the window member is disposed on the top surface of the first wall portion and the top surface of the second wall portion and is inclined with respect to the mirror surface. Accordingly, the traveling direction of the light reflected by the window member can be different from the traveling direction of the light reflected by the mirror surface and the light reflected by the window member can be prevented from to be noise light. Further, when any one of the first wall portion, the second wall portion, the third wall portion, and the fourth wall portion is set as the first reference wall portion, in the cross-section passing through the mirror surface and perpendicular to the first reference wall portion, the first line passing through the first end at the side of the first reference wall portion in the mirror surface and the first corner portion formed at the side of the first reference wall portion by the outer surface and the first side surface in the window member intersects the first reference wall portion. Since the first line is formed so as to intersect the first wall portion, the first reference wall portion is formed to be relatively thicker with respect to the window member. Accordingly, it is possible to support the window member by the thick first reference wall portion and to prevent the damage of the window member. Meanwhile, when the first reference wall portion is formed to be thick, it is conceivable to widen the thickness of the first reference wall portion toward the optical scanning device from the viewpoint of miniaturization. However, in that case, the area of the portion located at the inside of the frame member on the base is narrowed. When a wiring portion for electrical connection to the optical scanning device is formed in such a narrow portion, there is concern that defects such as short circuit or the like may occur in the wiring portion. In contrast, in the mirror unit, the wiring portion includes a portion extending inside the base and leads outside the frame member. Since the wiring portion is formed inside the base as such, it is possible to prevent defects such as short circuit or the like in the wiring portion. Further, for example, compared to a case in which the wiring portion is formed so as to extend along the surface of the base between the base and the frame member, the deterioration of the wiring portion can be prevented and the influence of the wiring portion on the bonding portion between the base and the frame member can be prevented. Thus, according to the mirror unit, it is possible to prevent the damage of the window member while reducing noise light and to improve the reliability.

The window member may be bonded to the frame member and a thickness of the window member may be smaller than a width of a region in which the window member and the frame member are bonded to each other. In this case, the window member can be formed to be thin and hence the influence of refraction at the window member can be restrained.

When one facing the first reference wall portion among the first wall portion, the second wall portion, the third wall portion, and the fourth wall portion is set as a second reference wall portion, in the cross-section, a second line passing through a second end at a side of the second reference wall portion in the mirror surface and a second corner portion formed at the side of the second reference wall portion by the outer surface and a second side surface in the window member may intersect the second reference wall portion. In this case, since the second reference wall portion is formed to be relatively thicker with respect to the window member, it is possible to support the window member by the thick second reference wall portion and to further reliably prevent the damage of the window member.

The wiring portion may extend inside the base so as to overlap the first reference wall portion when viewed from the first direction. When the wiring portion is to be pulled out toward the thick first reference wall portion, the above-described deterioration of the wiring portion or the like tends to occur. However, in the mirror unit, since the wiring portion is formed inside the base, it is possible to reliably prevent deterioration of the wiring portion or the like.

The wiring portion may include an electrode pad provided on the base in a region located at an inside of the frame member when viewed from the first direction, when one facing the first reference wall portion among the first wall portion, the second wall portion, the third wall portion, and the fourth wall portion is set as a second reference wall portion, a distance between the optical scanning device and the first reference wall portion may be longer than a distance between the optical scanning device and the second reference wall portion, and the electrode pad may be disposed between the optical scanning device and the first reference wall portion on the base. In this case, it is possible to ensure a space for disposing the electrode pad.

The first reference wall portion may be the first wall portion and the second reference wall portion may be the second wall portion. In this case, since the first wall portion is separated from the optical scanning device compared to the second wall portion, it is possible to prevent the light reflected by the mirror surface from being interrupted by the first wall portion higher than the second wall portion.

The wiring portion may be electrically connected to the optical scanning device in a first region located at an inside of the frame member when viewed from the first direction, extend inside the base in a second region overlapping the frame member when viewed from the first direction, and leads out to a third region located at an outside of the frame member when viewed from the first direction. In this case, it is possible to further reliably prevent deterioration of the wiring portion or the like.

According to an aspect of the present disclosure, it is possible to provide a mirror unit capable of preventing damage of a window member while reducing noise light and improving reliability.

BRIEF DESCRIPTION OF THE DRAWINGS

FIG. 6 is a cross-sectional view of a mirror unit according to a modified example.

DETAILED DESCRIPTION

Figure 1:
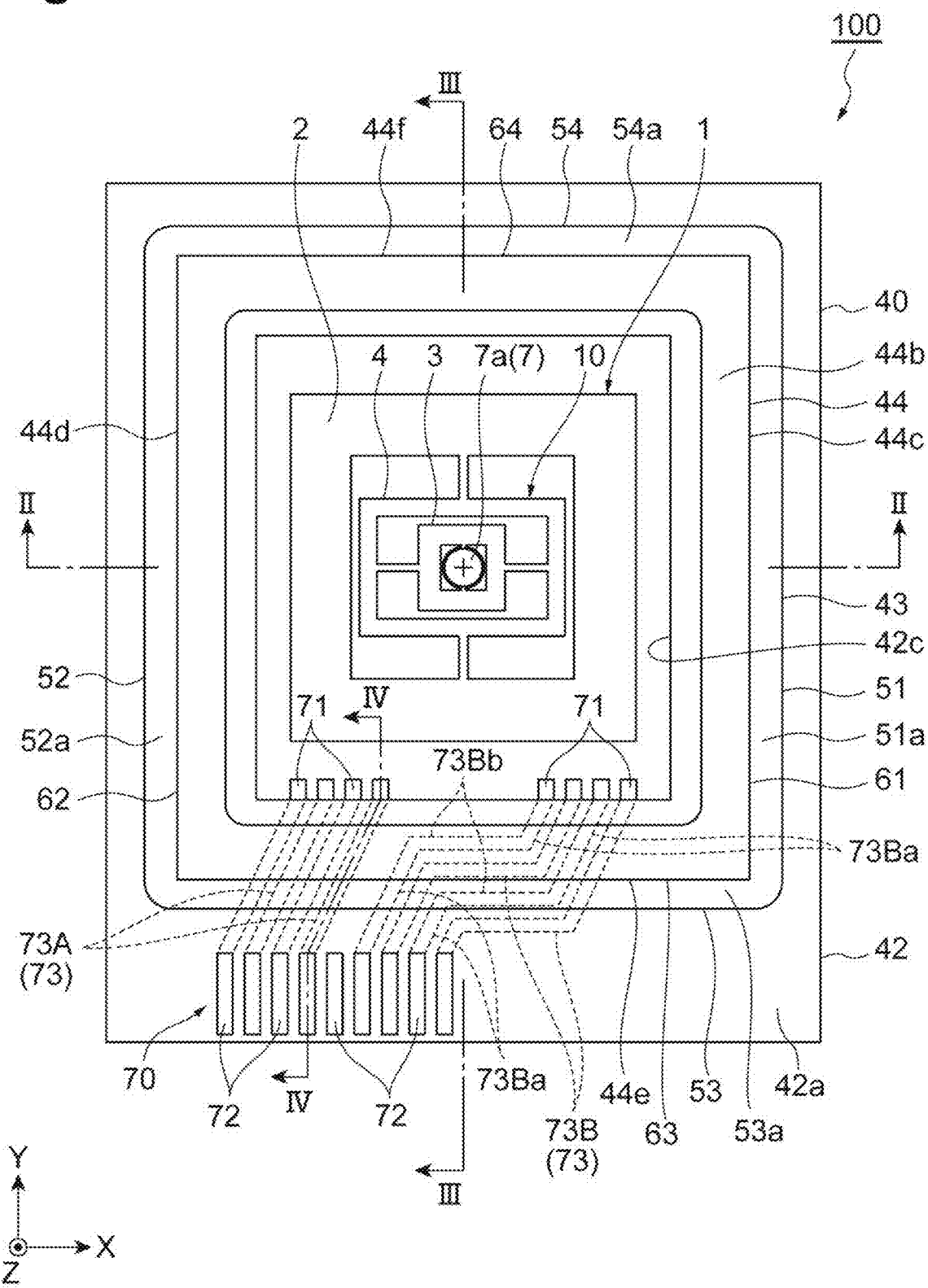
FIG. 1 is a plan view of a mirror unit according to an embodiment.

Hereinafter, an embodiment of the present disclosure will be described in detail with reference to the drawings. In the description below, the same or corresponding components will be denoted by the same reference numerals and redundant description will be omitted.

[Overall Configuration of Mirror Unit]

As illustrated in FIG. 1, a mirror unit 100 includes an optical scanning device 1 and a package 40 accommodating the optical scanning device 1. The package 40 includes a base 42, a frame member 43, and a window member 44.

The base 42 is formed in a rectangular plate shape from, for example, a non-magnetic material such as aluminum nitride or aluminum oxide. The base 42 includes a main surface 42a and a rear surface 42b on the side opposite to the main surface 42a. The main surface 42a is a surface constituting a part of the inner surface of the package 40. The main surface 42a is provided with a depression 42c. A bottom surface of the depression 42c is provided with a depression 42d. The optical scanning device 1 is disposed on the base 42, more specifically, a bottom surface of the depression 42c. A magnetic field generating unit (not illustrated) which generates a magnetic field acting on a first drive coil 11 and a second drive coil 12 of the optical scanning device 1 to be described later is disposed on the side of the rear surface 42b of the base 42. The magnetic field generating unit includes, for example, permanent magnets in a Halbach array.

The frame member 43 is disposed on the main surface 42a so as to surround the optical scanning device 1 (to surround a mirror surface 7a to be described later) when viewed from the Z-axis direction (the first direction) perpendicular to the main surface 42a of the base 42. The frame member 43 is formed in a rectangular frame shape from, for example, a non-magnetic material such as aluminum nitride or aluminum oxide.

The window member 44 is configured by, for example, forming an anti-reflection film on both surfaces of a rectangular plate base material formed of a light-transmitting material such as glass. The window member 44 is disposed on the frame member 43 so as to cover one opening 43a of the frame member 43 and faces the base 42 and the optical scanning device 1 in the Z-axis direction. The window member 44 is bonded to the frame member 43 by, for example, a bonding material 45 such as low-melting glass so as to hermetically seal the opening 43a.

The base 42 is bonded to the frame member 43 by, for example, a bonding material 46 such as low-melting glass so as to hermetically seal the other opening 43b of the frame member 43. Accordingly, the inside of the package 40 is hermetically sealed. The base 42 and the frame member 43 may be integrally formed so as to configure a single member.

The bonding with the bonding materials 45 and 46 is not limited to the bonding with the low-melting glass and may be, for example, bonding with resin adhesive, low-temperature solder (Sn/Pb or Sn/Cu-based), low-temperature brazing material (Au/Sn alloy, Au/Ge alloy, or the like), high-temperature brazing material (Ag-based or the like), projection welding, seam seal welding, laser welding, electron beam welding, or the like.

[Configuration of Optical Scanning Device]

Figure 2:
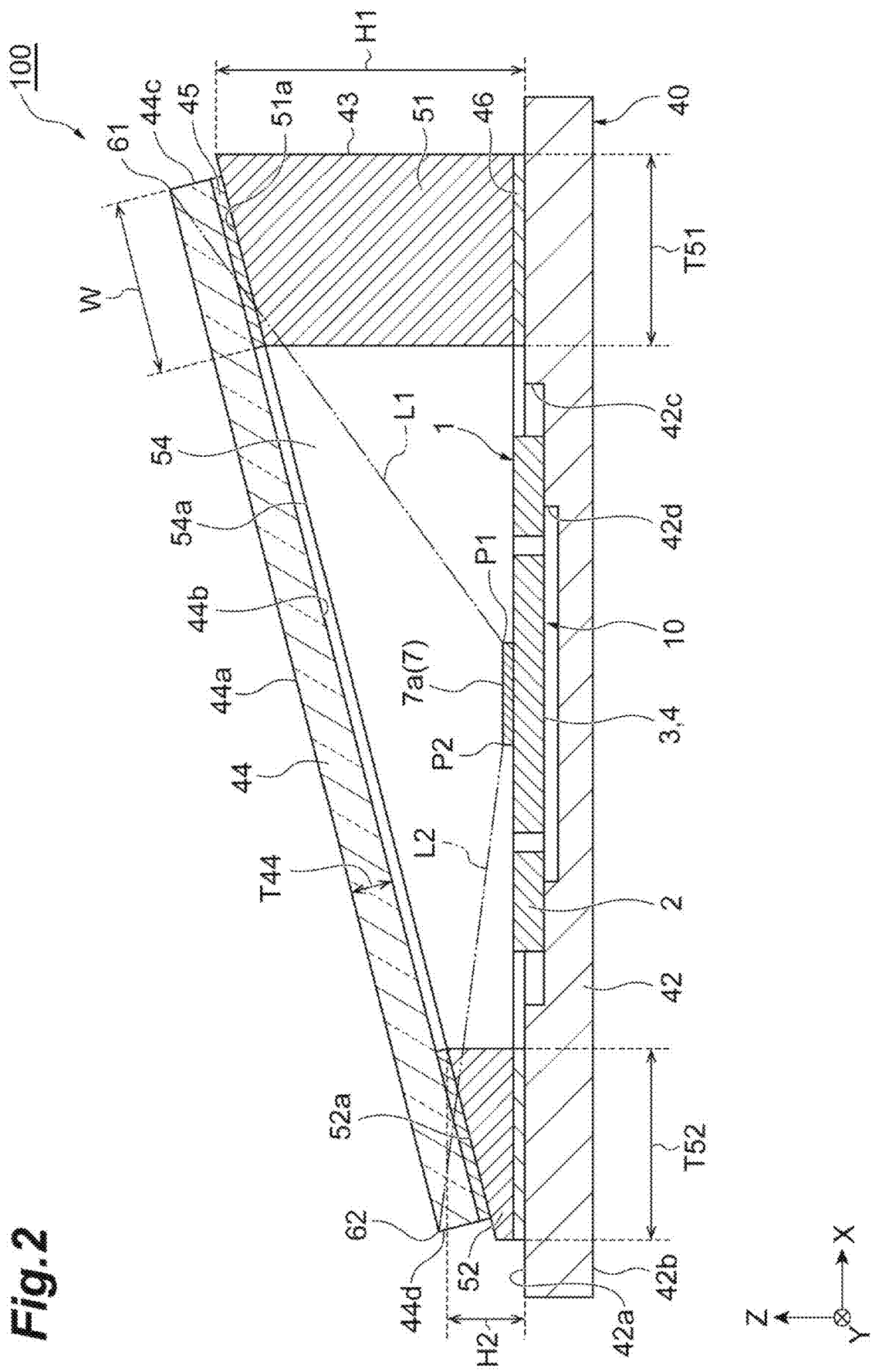
FIG. 2 is a cross-sectional view taken along a line of FIG. 1.

As illustrated in FIG. 2, the optical scanning device 1 includes a support portion 2 and a movable portion 10 which is swingable with respect to the support portion 2. The movable portion 10 includes a first movable portion 3, a second movable portion 4, a pair of first connection portions 5, a pair of second connection portions 6, and a mirror 7. The support portion 2, the first movable portion 3, the second movable portion 4, the pair of first connection portions 5, and the pair of second connection portions 6 are integrally formed by, for example, a Silicon on Insulator (SOI) substrate. That is, the optical scanning device 1 is configured as a Micro Electro Mechanical Systems (MEMS) device.

The first movable portion 3 is formed in, for example, a rectangular plate shape. The second movable portion 4 is formed in, for example, a rectangular ring shape so as to surround the first movable portion 3 with a gap when viewed from an optical axis direction A. The support portion 2 is formed in, for example, a rectangular ring shape so as to surround the second movable portion 4 with a gap when viewed from the optical axis direction A. That is, the support portion 2 is formed in a frame shape so as to surround the first movable portion 3 and the second movable portion 4 when viewed from the optical axis direction A.

The first movable portion 3 is connected to the second movable portion 4 via the pair of first connection portions 5 so as to be swingable around a first axis X1. That is, the first movable portion 3 is supported by the support portion 2 so as to be swingable around the first axis X1. The first movable portion 3 includes a first portion 31 and a second portion 32. The first portion 31 is formed in, for example, a circular shape when viewed from the optical axis direction A. The second portion 32 is formed in, for example, a rectangular ring shape when viewed from the optical axis direction A. The first portion 31 is surrounded by the second portion 32 when viewed from the optical axis direction A and is connected to the second portion 32 via a plurality of (in this example, two) connection portions 33. That is, gaps are formed between the first portion 31 and the second portion 32 except for the plurality of connection portions 33.

The connection portion 33 is located, for example, at the center of two sides of the rectangular inner edge of the second portion 32 intersecting a second axis X2. That is, in this example, the connection portion 33 is located on the second axis X2. The first portion 31 may be connected to the second portion 32 in a direction along at least the second axis X2.

The second movable portion 4 is connected to the support portion 2 via the pair of second connection portions 6 so as to be swingable around the second axis X2. That is, the second movable portion 4 is supported by the support portion 2 so as to be swingable around the second axis X2. The first axis X1 and the second axis X2 are perpendicular to the optical axis direction A and intersect each other (orthogonal to each other in this example). The first portion 31 may be formed in a rectangular shape or polygonal shape when viewed from the optical axis direction A. The first portion 31 may be formed in a circular shape (for example, an oval shape) when viewed from the optical axis direction A. The second portion 32 may be formed in a ring shape or a polygonal ring shape of a pentagon or more when viewed from the optical axis direction A.

The pair of first connection portions 5 are disposed on the first axis X1 so as to sandwich the first movable portion 3 in a gap between the second movable portion 4 and the second portion 32 of the first movable portion 3. Each first connection portion 5 functions as a torsion bar. The pair of second connection portions 6 is disposed on the second axis X2 so as to sandwich the second movable portion 4 in a gap between the second movable portion 4 and the support portion 2. Each second connection portion 6 functions as a torsion bar.

The mirror 7 is provided on the first portion 31 of the first movable portion 3. The mirror 7 is formed on the surface at the side opposite to the base 42 (at the side of the window member 44) in the first portion 31 so as to include an intersection point between the first axis X1 and the second axis X2. For example, the mirror 7 is formed in a circular, oval, or rectangular film shape from a metal material such as aluminum, an aluminum-based alloy, gold, or silver. A surface at the side opposite to the first movable portion 3 in the mirror 7 constitutes the mirror surface 7a extending in a direction perpendicular to the optical axis direction A. The center (geometric center, centroid) of the mirror surface 7a matches the intersection between the first axis X1 and the second axis X2 when viewed from the optical axis direction A. In this way, since the mirror 7 is provided on the first portion 31 connected to the second portion 32 through the plurality of connection portions 33, deformation such as bending of the mirror 7 can be prevented even when the first movable portion 3 swings around the first axis X1 at the resonant frequency level.

The distance from the outer edge of the mirror surface 7a to the outer edge of the first portion 31 is smaller than the width of the connection portion 33. The width of the connection portion 33 is the length in a direction (in this example, a direction along the first axis X1) perpendicular to the extension direction of the connection portion 33 (in this example, a direction along the second axis X2). The first movable portion 3 may not include the second portion 32 and the connection portion 33. The distance from the outer edge of the mirror surface 7a to the outer edge of the first portion 31 may be smaller than the width of the second connection portion 6. The width of the second connection portion 6 is the length in a direction (in this example, a direction along the first axis X1) perpendicular to the extension direction of the second connection portion 6 (in this example, a direction along the second axis X2).

Further, the optical scanning device 1 includes a first drive coil 11, a second drive coil 12, wirings 15a and 15b, wirings 16a and 16b, electrode pads 21a and 21b, and electrode pads 22a and 22b. In FIG. 2, for convenience of description, the first drive coil 11 and the second drive coil 12 are indicated by a one dotted chain line and the wirings 15a and 15b and the wirings 16a and 16b are indicated by a solid line.

The first drive coil 11 is provided in the second portion 32 of the first movable portion 3. The first drive coil 11 is wound a plurality of times in a spiral shape (a swirl shape) in a region outside the mirror 7 (that is, the second portion 32) when viewed from the optical axis direction A. A magnetic field generated by the magnetic field generating unit acts on the first drive coil 11.

The first drive coil 11 is disposed in a groove formed on the surface of the first movable portion 3. That is, the first drive coil 11 is buried in the first movable portion 3. One end of the first drive coil 11 is connected to the electrode pad 21a through the wiring 15a. The wiring 15a extends from the first movable portion 3 to the support portion 2 through one first connection portion 5, the second movable portion 4, and one second connection portion 6. For example, the wiring 15a and the electrode pad 21a are integrally formed of a metal material such as tungsten, aluminum, gold, silver, copper, or an aluminum-based alloy.

The other end of the first drive coil 11 is connected to the electrode pad 21b through the wiring 15b. The wiring 15b extends from the first movable portion 3 to the support portion 2 through the other first connection portion 5, the second movable portion 4, and the other second connection portion 6. For example, the wiring 15b and the electrode pad 21b are integrally formed of a metal material such as tungsten, aluminum, gold, silver, copper, or an aluminum-based alloy.

The second drive coil 12 is provided in the second movable portion 4. The second drive coil 12 is wound a plurality of times in a spiral shape (a swirl shape) in the second movable portion 4. A magnetic field generated by the magnetic field generating unit acts on the second drive coil 12. The second drive coil 12 is disposed in a groove formed on the surface of the second movable portion 4. That is, the second drive coil 12 is buried in the second movable portion 4.

One end of the second drive coil 12 is connected to the electrode pad 22a through the wiring 16a. The wiring 16a extends from the second movable portion 4 to the support portion 2 through one second connection portion 6. For example, the wiring 16a and the electrode pad 22a are integrally formed of a metal material such as tungsten, aluminum, gold, silver, copper, or an aluminum-based alloy.

The other end of the second drive coil 12 is connected to the electrode pad 22b through the wiring 16b. The wiring 16b extends from the second movable portion 4 to the support portion 2 through the other second connection portion 6. For example, the wiring 16b and the electrode pad 22b are integrally formed of a metal material such as tungsten, aluminum, gold, silver, copper, or an aluminum-based alloy.

Figure 4:
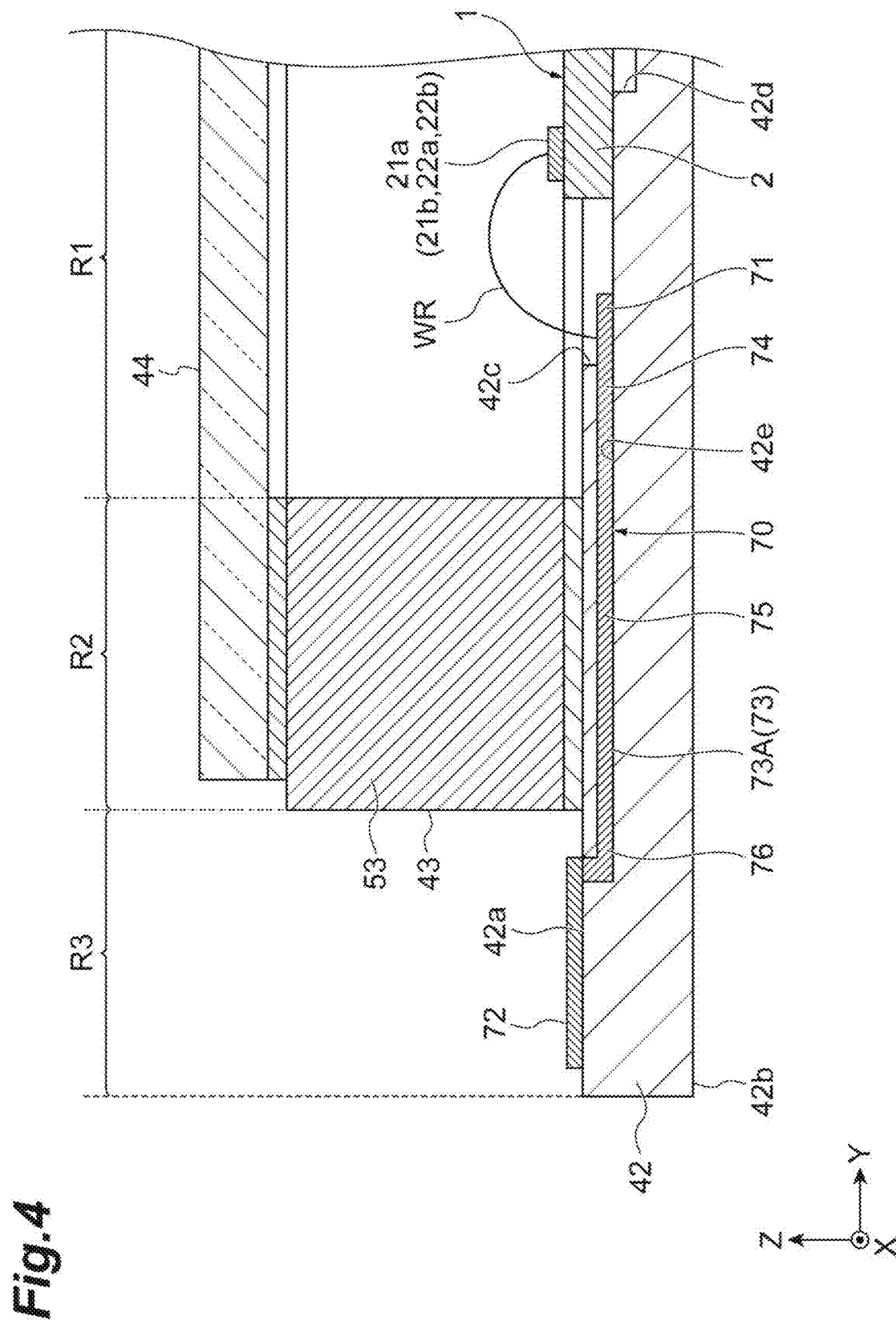
FIG. 4 is a cross-sectional view taken along a line IV-IV of FIG. 1.
Figure 5:
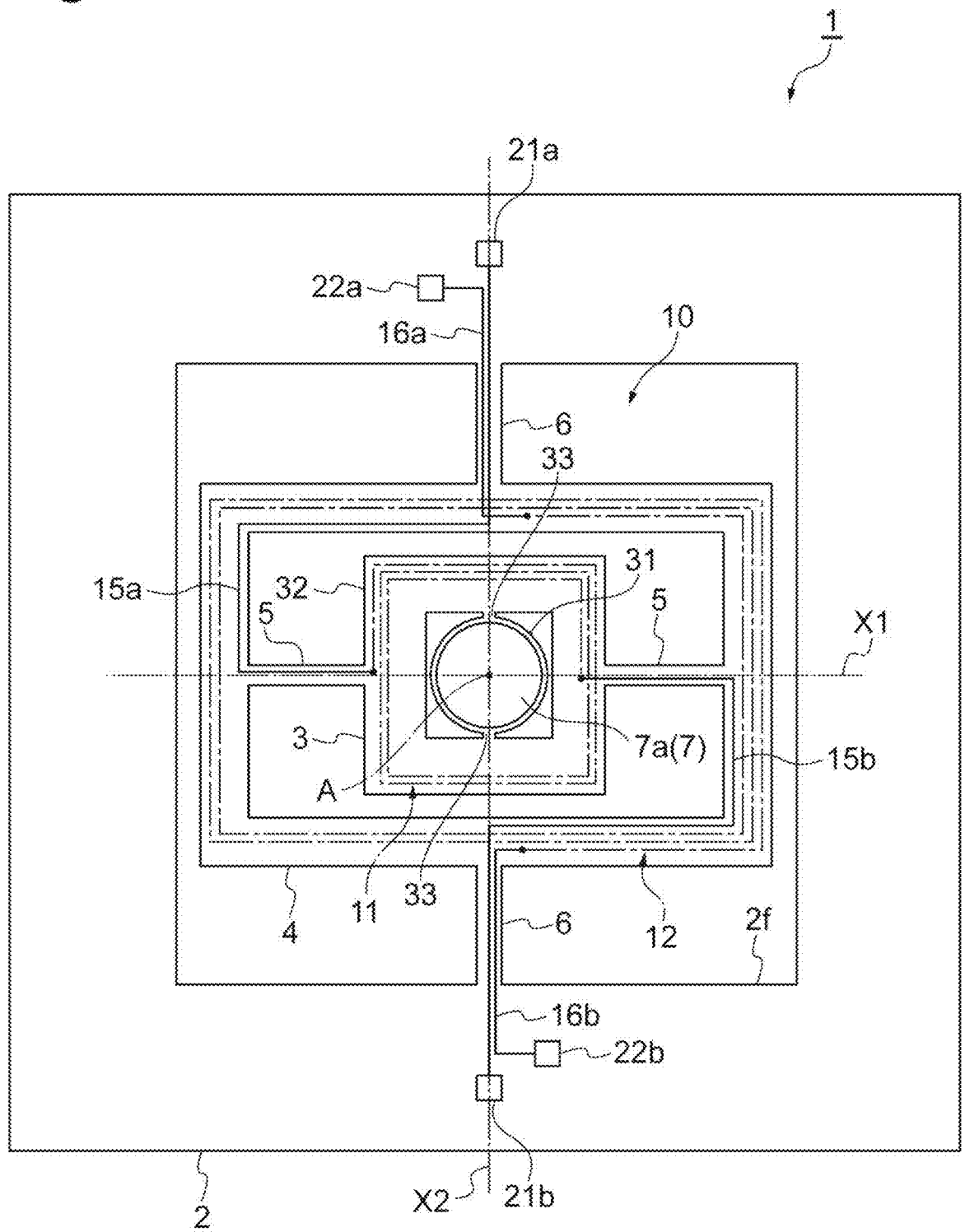
FIG. 5 is a plan view of an optical scanning device.

The number and arrangement of the electrode pads 21a, 21b, 22a, and 22b are not limited to the example illustrated in FIG. 4. As in the example of FIG. 4, the electrode pad 21a may be disposed at one side of the second axis X2 with respect to the movable portion 10 and the electrode pad 21b may be disposed at the other side of the second axis X2 with respect to the movable portion 10. Alternatively, both the electrode pads 21a and 21b may be disposed at one side or the other side of the second axis X2 with respect to the movable portion 10. In the latter case, the wirings 15a and 15b may extend on the same second connection portion 6. These points are the same in the electrode pads 22a and 22b and the wirings 16a and 16b.

Hereinafter, first to fifth examples will be described as an operation example of the movable portion 10 of the optical scanning device 1. In the first example, a high-frequency drive current is applied to the first drive coil 11. At this time, since a magnetic field generated by the magnetic field generating unit acts on the first drive coil 11, a Lorentz force is generated in the first drive coil 11. Accordingly, the first movable portion 3 is swung around the first axis X1, for example, at the resonant frequency level.

Further, a drive current of a certain magnitude is applied to the second drive coil 12. At this time, since a magnetic field generated by the magnetic field generating unit acts on the second drive coil 12, a Lorentz force is generated in the second drive coil 12. Accordingly, the second movable portion 4 is rotated around the second axis X2, for example, in response to the magnitude of the drive current and is stopped at that state. Accordingly, according to the optical scanning device 1, light emitted from a predetermined light source can be scanned while being reflected by the mirror surface 7a. Light is incident to the mirror surface 7a through the window member 44 from the outside, is reflected by the mirror surface 7a, and is emitted to the outside through the window member 44. In the first example, the first movable portion 3 is swung at the resonant frequency and the second movable portion 4 is used statically.

In the second example, similarly to the operation of the first movable portion 3 of the first example, the first movable portion 3 is swung in response to the resonant frequency when a high-frequency drive current is applied to the first drive coil 11 and the second movable portion 4 is swung in response to the resonant frequency when a high-frequency drive current is applied to the second drive coil 12. In this way, in the second example, both the first movable portion 3 and the second movable portion 4 are swung at the resonant frequency.

In the third example, similarly to the operation of the second movable portion 4 of the first example, the first movable portion 3 is rotated and stopped around the first axis X1 in response to the magnitude of the drive current when a drive current of a certain magnitude is applied to the first drive coil 11 and the second movable portion 4 is rotated and stopped around the second axis X2 in response to the magnitude of the drive current when a drive current of a certain magnitude is applied to the second drive coil 12. In this way, in the third example, both the first movable portion 3 and the second movable portion 4 are used statically.

In the fourth example and the fifth example, only the first movable portion 3 is driven. In the fourth example, since a high-frequency drive current is applied to the first drive coil 11, the first movable portion 3 is swung in response to the resonant frequency. In the fifth example, since a drive current of a certain magnitude is applied to the first drive coil 11, the first movable portion 3 is rotated and stopped around the first axis X1 in response to the magnitude of the drive current. The fourth example and the fifth example can be used, for example, in a case in which the second movable portion 4 is not provided or the like.

As described above, the optical scanning device 1 is disposed on the base 42. The support portion 2 is fixed to the bottom surface of the depression 42c and the first movable portion 3 and the second movable portion 4 face the bottom surface of the depression 42d. Since the depression 42d is provided, the first movable portion 3 and the second movable portion 4 can swing without interfering with the base 42.

[Configuration of Package]

Figure 3:
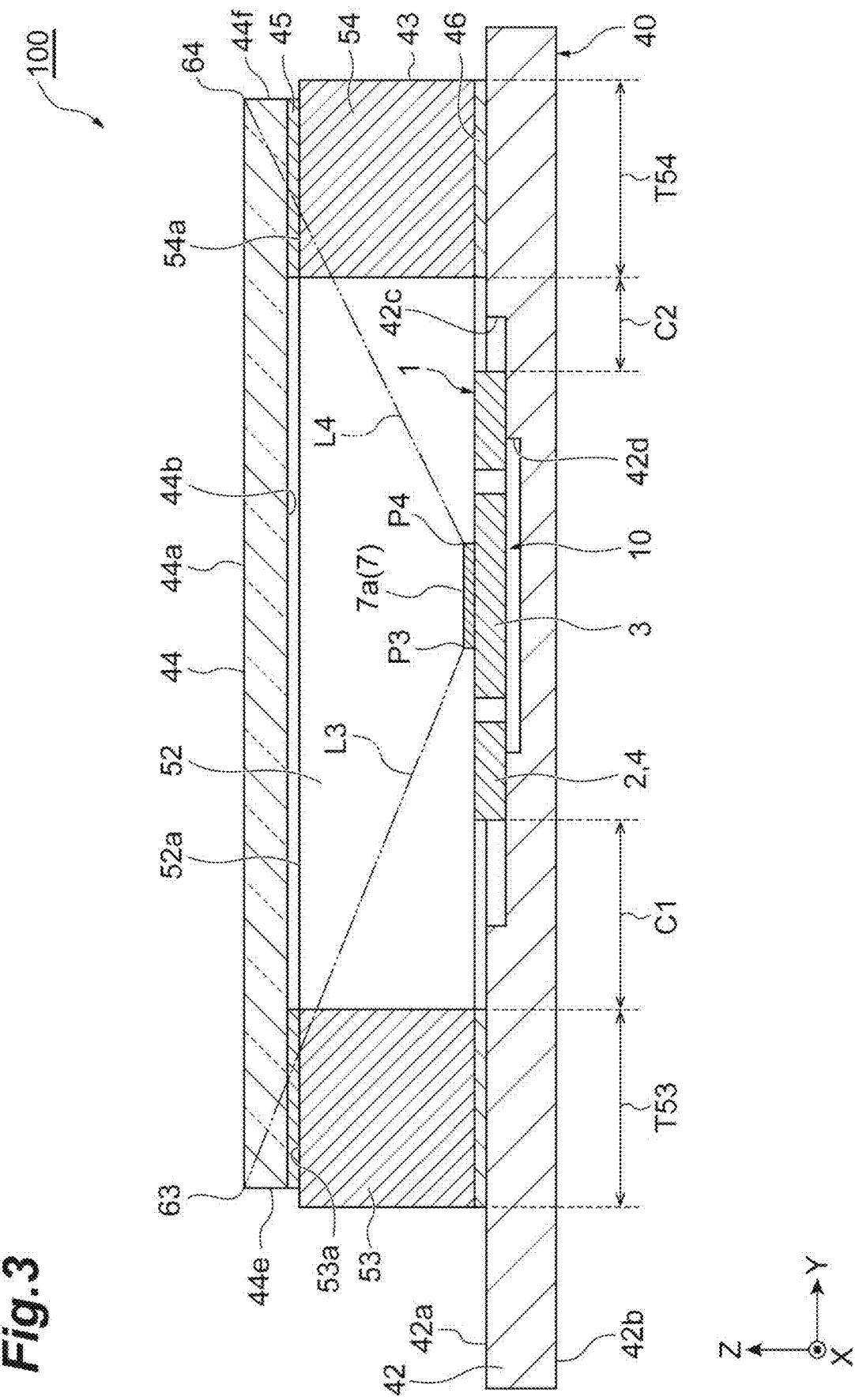
FIG. 3 is a cross-sectional view taken along a line of FIG. 1.

As illustrated in FIGS. 1 and 3, the frame member 43 includes a first wall portion 51, a second wall portion 52, a third wall portion 53, and a fourth wall portion 54. Each of the wall portions 51 to 54 is formed in a plate shape and has the same thickness. The first wall portion 51 and the second wall portion 52 extend in parallel to each other and face each other in the X-axis direction (the second direction) perpendicular to the Z-axis direction. The third wall portion 53 and the fourth wall portion 54 extend in parallel to each other and face each other in the Y-axis direction (the third direction) perpendicular to both the Z-axis direction and the X-axis direction. The third wall portion 53 is connected to one end of the first wall portion 51 and one end of the second wall portion 52 and the fourth wall portion 54 is connected to the other end of the first wall portion 51 and the other end of the second wall portion 52. The third wall portion 53 and the fourth wall portion 54 have, for example, the same shape.

A top surface 51a at the side opposite to the base 42 in the first wall portion 51 is inclined with respect to the main surface 42a so as to move away from the main surface 42a of the base 42 as it goes away from the second wall portion 52. A top surface 52a at the side opposite to the base 42 in the second wall portion 52 is inclined with respect to the main surface 42a so as to move away from the main surface 42a of the base 42 as it goes toward the first wall portion 51. A height H1 of the first wall portion 51 is higher than a height H2 of the second wall portion 52. The height H1 of the first wall portion 51 is a maximum value of the distance from the main surface 42a to the top surface 51a and the height H2 of the second wall portion 52 is a maximum value from the main surface 42a to the top surface 52a.

A top surface 53a at the side opposite to the base 42 in the third wall portion 53 is inclined with respect to the main surface 42a so as to move away from the main surface 42a of the base 42 as it goes toward the first wall portion 51 when viewed from the Y-axis direction. A top surface 54a at the side opposite to the base 42 in the fourth wall portion 54 is inclined with respect to the main surface 42a so as to move away from the main surface 42a of the base 42 as it goes toward the first wall portion 51 when viewed from the Y-axis direction.

The top surfaces 51a to 54a are flush with one other and located on the same plane. The window member 44 is disposed on the top surfaces 51a to 54a and is inclined with respect to the main surface 42a (the mirror surface 7a) so as to move away from the main surface 42a as it goes from the second wall portion 52 toward the first wall portion 51. In other words, each of the top surfaces 51a to 54a is inclined corresponding to an angle of the inclination of the window member 44.

The first wall portion 51 may be formed by a plurality of portions. These portions may be forming separately with a gap provided therebetween. In the embodiment, the entire top surface 51a is formed flat, but the top surface 51a may be divided into a plurality of regions by forming a notch, a depression, a convex portion, or the like on the top surface 51a. The entire top surface 51a does not need to be inclined at an angle corresponding to the inclination of the window member 44. For example, a line connecting two points in the top surface 51a may be inclined at an angle corresponding to the inclination of the window member 44. These matters are the same for the second wall portion 52 to the fourth wall portion 54. The window member 44 may not be bonded to the frame member 43 in the entire top surfaces 51a to 54a and may be boded to the frame member 43 in at least a part of the top surfaces 51a to 54a.

The window member 44 includes an outer surface 44a, an inner surface 44b, a first side surface 44c, a second side surface 44d, a third side surface 44e, and a fourth side surface 44f. The outer surface 44a is a surface at the side opposite to the frame member 43 and the inner surface 44b is a surface at the side of the frame member 43. The outer surface 44a and the inner surface 44b extend in parallel to each other. Each of the side surfaces 44c to 44f extends in a direction perpendicular to the outer surface 44a and the inner surface 44b and is continuous to the outer surface 44a and the inner surface 44b. The window member 44 is disposed on the frame member 43 so that the inner surface 44b faces the top surfaces 51a to 54a. The first side surface 44c, the second side surface 44d, the third side surface 44e, and the fourth side surface 44f are respectively located on the top surface 51a, the top surface 52a, the top surface 53a, and the top surface 54a.

The window member 44 includes a first corner portion 61 formed at the side of the first wall portion 51 by the outer surface 44a and the first side surface 44c, a second corner portion 62 formed at the side of the second wall portion 52 by the outer surface 44a and the second side surface 44d, a third corner portion 63 formed at the side of the third wall portion 53 by the outer surface 44a and the third side surface 44e, and a fourth corner portion 64 formed at the side of the fourth wall portion 54 by the outer surface 44a and the fourth side surface 44f. When viewed from the Z-axis direction, the first corner portion 61 overlaps the top surface 51a and the second corner portion 62 overlaps the top surface 52a. When viewed from the Z-axis direction, the third corner portion 63 overlaps the top surface 53a and the fourth corner portion 64 overlaps the top surface 54a. In this example, the first side surface 44c is a flat surface, but the first side surface 44c may be a curved surface. In this case, the first corner portion 61 is formed at a boundary part between the flat outer surface 44a and the curved first side surface 44c. Similarly, the second side surface 44d may be a curved surface. In this case, the second corner portion 62 is formed at a boundary part between the flat outer surface 44a and the curved second side surface 44d.

A thickness T44 of the window member 44 is thinner than each of a thickness T51 of the first wall portion 51, a thickness T52 of the second wall portion 52, a thickness T53 of the third wall portion 53, and a thickness T54 of the fourth wall portion 54. In this example, the thicknesses T51 to T54 of the wall portions 51 to 54 are the same. Further, the thickness T44 of the window member 44 is smaller than a width W of a bonding region in which the window member 44 and the frame member 43 are bonded to each other by a bonding material 45. The width W is a width in a direction parallel to each of the top surfaces 51a to 54a and orthogonal to the extension direction of the frame member 43. In this example, the width W of the bonding region is the same along the entire periphery of the frame member 43, but when the width of the bonding region changes in the circumferential direction of the frame member 43, the width W is a maximum value of the width of the bonding region.

A positional relationship of respective members will be described with reference to FIGS. 2 and 3. The optical scanning device 1 is disposed, for example, so that the first axis X1 is parallel to the X-axis direction and the second axis X2 is parallel to the Y-axis direction. FIG. 2 illustrates a cross-section parallel to both the X-axis direction and the Z-axis direction and passing through the center of the mirror surface 7a. The cross-section of FIG. 2 is perpendicular to the Y-axis direction and is perpendicular to the first wall portion 51 and the second wall portion 52. FIG. 3 illustrates a cross-section parallel to both the Y-axis direction and the Z-axis direction and passing through the center of the mirror surface 7a. The cross-section of FIG. 3 is perpendicular to the X-axis direction and is perpendicular to the third wall portion 53 and the fourth wall portion 54.

FIGS. 2 and 3 illustrate a non-rotation state (a non-drive state and an initial state) in which the movable portion 10 does not rotate around the first axis X1 and the second axis X2. In the non-rotation state, the first movable portion 3 does not rotate around the first axis X1 and the second movable portion 4 does not around the second axis X2. In the non-rotation state, the mirror surface 7a is parallel to the main surface 42a of the base 42.

In the cross-section of FIG. 2, a first line L1 which passes through a first end P1 corresponding to an end portion at the side of the first wall portion 51 in the mirror surface 7a and a vertex of the first corner portion 61 intersects the first wall portion 51. That is, the first line L1 passes through the first wall portion 51. Further, in the cross-section of FIG. 2, a second line L2 which passes through a second end P2 corresponding to an end portion at the side of the second wall portion 52 in the mirror surface 7a and a vertex of the second corner portion 62 intersects the second wall portion 52. That is, the second line L2 passes through the second wall portion 52.

In the cross-section of FIG. 3, a third line L3 which passes through a third end P3 corresponding to an end portion at the side of the third wall portion 53 in the mirror surface 7a and a vertex of the third corner portion 63 intersects the third wall portion 53. That is, the third line L3 passes through the third wall portion 53. Further, in the cross-section of FIG. 3, a fourth line L4 which passes through a fourth end P4 corresponding to an end portion at the side of the fourth wall portion 54 in the mirror surface 7a and a vertex of the fourth corner portion 64 intersects the fourth wall portion 54. That is, the fourth line L4 passes through the fourth wall portion 54.

when the mirror surface 7a is formed by mirror-finishing the surface of the first movable portion 3, the end portion of the mirror surface 7a is the end portion of the processed region. Alternatively, when a reflection film is not formed and the surface itself of the first movable portion 3 constitutes the mirror surface 7a, the end portion of the mirror surface 7a is the end portion of the first movable portion 3. In the above-described embodiment, the first movable portion 3 is connected to the first connection portion 5 in a cross-section perpendicular to the Y-axis direction and passing through the center of the mirror surface 7a. In this case, the end portion of the first movable portion 3 is located at a boundary part between the first movable portion 3 and the first connection portion 5. As in the embodiment, when the first movable portion 3 includes the first portion 31 and the second portion 32 surrounding the first portion 31 and the mirror surface 7a is provided on the first portion 31, the end portion of the mirror surface 7a is located in the vicinity of the end portion of the first portion 31.

[Wiring Portion]

As illustrated in FIGS. 1 and 4, the mirror unit 100 further includes a wiring portion 70 electrically connected to the optical scanning device 1. The wiring portion 70 includes a plurality of (eight in this example) inner electrode pads 71, a plurality of (nine in this example) outer electrode pads 72, and a plurality of (eight in this example) wirings 73. Each of the inner electrode pad 71, the outer electrode pad 72, and the wiring 73 is formed of, for example, a metal material such as tungsten, aluminum, gold, silver, copper, or an aluminum-based alloy.

The inner electrode pad 71 is provided in an inner region (a first region) R1 located at the inside of the frame member 43 when viewed from the Z-axis direction. The inner electrode pad 71 is disposed on the base 42, more specifically, the bottom surface of the depression 42c. The inner electrode pad 71 is disposed between the optical scanning device 1 and the third wall portion 53 on the bottom surface of the depression 42c. In the mirror unit 100, a distance C1 between the optical scanning device 1 and the third wall portion 53 in the Y-axis direction is longer than a distance C2 between the optical scanning device 1 and the fourth wall portion 54 in the Y-axis direction (FIG. 3). That is, the inner electrode pad 71 is disposed between the optical scanning device 1 and the third wall portion 53 which is distant from the optical scanning device 1 in the third wall portion 53 and the fourth wall portion 54. In the mirror unit 100, the distance between the optical scanning device 1 and the first wall portion 51 in the X-axis direction is the same as the distance between the optical scanning device 1 and the second wall portion 52 in the X-axis direction. The plurality of inner electrode pads 71 are arranged, for example, in the X-axis direction. Each of the plurality of inner electrode pads 71 is electrically connected to one of the electrode pads 21a, 21b, 22a, and 22b of the optical scanning device 1 through a wire WR.

The outer electrode pad 72 is provided in an outer region (a third region) R3 located at the outside of the frame member 43 when viewed from the Z-axis direction. The outer electrode pad 72 is disposed on the base 42, more specifically, the main surface 42a. The plurality of outer electrode pads 72 are arranged at the same intervals, for example, in the X-axis direction. The plurality of outer electrode pads 72 are used in the electrical connection to, for example, an external control device or the like.

As illustrated in FIG. 1, the plurality of wirings 73 respectively electrically connect the inner electrode pad 71 and the outer electrode pad 72 to each other. The plurality of wirings 73 include a plurality of (four in this example) wirings 73A and a plurality of (four in this example) wirings 73B.

Each wiring 73A is inclined with respect to the X-axis direction and the Y-axis direction when viewed from the Z-axis direction and extends in a linear shape. Each wiring 73B has a plurality of (two in this example) bent portions. Each wiring 73B includes a pair of first linear portions 73Ba which are inclined with respect to the X-axis direction and the Y-axis direction when viewed from the Z-axis direction and extend in a linear shape and a second linear portion 73Bb which extends in a linear shape in the X-axis direction when viewed from the Z-axis direction. The pair of first linear portions 73Ba are located at both ends of the wiring 73B and are connected to the second linear portion 73Bb. The bent portions are formed at boundary parts between the pair of first linear portions 73Ba and the second linear portion 73Bb.

As illustrated in FIG. 4, each wiring 73 is disposed in a hole 42e formed in the base 42 and extends inside the base 42. Each wiring 73 is electrically connected to the inner electrode pad 71 in an inner region R1, extends inside the base 42 in an overlapping region (a second region) R2 overlapping the frame member 43 when viewed from the Z-axis direction, and leads out to the outer region R3. That is, each wiring 73 includes a first portion 74 located in the inner region R1, a second portion 75 located in the overlapping region R2, and a third portion 76 located in the outer region R3.

The first portion 74 is connected to the inner electrode pad 71. In this example, the wiring 73 and the inner electrode pad 71 are integrally formed (as a single member). In other words, the wiring 73 is provided to be exposed in the inner region R1 and the exposed portion constitutes the inner electrode pad 71. The second portion 75 is connected to the first portion 74 and extends in a linear shape below the third wall portion 53. In other words, the wiring 73 extends inside the base 42 so as to overlap the third wall portion 53 when viewed from the Z-axis direction in the overlapping region R2. The third portion 76 is connected to the second portion 75, leads out from the overlapping region R2 to the outer region R3, and is connected to the rear surface of the outer electrode pad 72. Although the wiring 73A of the wiring 73 is illustrated in FIG. 4, the wiring 73B also extends inside the base 42 similarly to the wiring 73A.

Function and Effect

In the mirror unit 100, a height H1 of the first wall portion 51 is higher than a height H2 of the second wall portion 52 and the window member 44 is disposed on the top surface 51a of the first wall portion 51 and the top surface 52a of the second wall portion 52 and is inclined with respect to the mirror surface 7a. Accordingly, the traveling direction of the light reflected by the window member 44 can be different from the traveling direction of the light reflected by the mirror surface 7a and the light reflected by the window member 44 can be prevented from to be noise light.

In a cross-section (FIG. 2) passing through the mirror surface 7a and perpendicular to the first wall portion 51, the first line L1 passing through the first end P1 at the side of the first wall portion 51 in the mirror surface 7a and the first corner portion 61 formed at the side of the first wall portion 51 by the outer surface 44a and the first side surface 44c in the window member 44 intersects the first wall portion 51. In the cross-section (FIG. 2), the second line L2 passing through the second end P2 at the side of the second wall portion 52 in the mirror surface 7a and the second corner portion 62 formed at the side of the second wall portion 52 by the outer surface 44a and the second side surface 44d in the window member 44 intersects the second wall portion 52. In a cross-section (FIG. 3) passing through the mirror surface 7a and perpendicular to the third wall portion 53, the third line L3 passing through the third end P3 at the side of the third wall portion 53 in the mirror surface 7a and the third corner portion 63 forming at the side of the third wall portion 53 by the outer surface 44a and the third side surface 44e in the window member 44 intersects the third wall portion 53. In the cross-section (FIG. 3), the fourth line L4 passing through the fourth end P4 at the side of the fourth wall portion 54 in the mirror surface 7a and the fourth corner portion 64 formed at the side of the fourth wall portion 54 by the outer surface 44a and the fourth side surface 44f of the window member 44 intersects the fourth wall portion 54. Since the lines L1 to L4 are formed so as to intersect the wall portions 51 to 54, each of the wall portions 51 to 54 is formed so as to be relatively thicker with respect to the window member 44. Accordingly, it is possible to support the window member 44 by the thick wall portions 51 to 54 and to prevent the damage of the window member 44.

Meanwhile, when the wall portions 51 to 54 are formed to be thick, it is conceivable to widen the thickness of the wall portions 51 to 54 toward the optical scanning device 1 from the viewpoint of miniaturization. However, in that case, the area of the portion located at the inside of the frame member 43 on the base 42 is narrowed. When a wiring portion for electrical connection to the optical scanning device 1 is formed in such a narrow portion, there is concern that defects such as short circuit or the like may occur in the wiring portion. In contrast, in the mirror unit 100, the wiring portion 70 includes a portion (a wiring 73) extending inside the base 42 and leads outside the frame member 43. When the wiring portion 70 is formed inside the base 42 in this way, it is possible to prevent defects such as short circuit or the like in the wiring portion 70. Further, for example, compared to a case in which the wiring portion 70 is formed so as to extend along the main surface 42a of the base 42 between the base 42 and the frame member 43, the deterioration of the wiring portion 70 can be prevented and the influence of the wiring portion 70 on the bonding portion (the bonding material 46) between the base 42 and the frame member 43 can be prevented. Thus, according to the mirror unit 100, it is possible to prevent the damage of the window member 44 while reducing noise light and to improve reliability.

The thickness T44 of the window member 44 is smaller than the width W in which the window member 44 and the frame member 43 are bonded to each other. Accordingly, the window member 44 can be formed to be thin and the influence of refraction at the window member 44 can be refrained.

The first line L1 intersects the first wall portion 51 and the second line L2 intersects the second wall portion 52. Accordingly, since both the first wall portion 51 and the second wall portion 52 facing each other are formed to be relatively thicker with respect to the window member 44, it is possible to support the window member 44 by the thick wall portions 51 and 52 and to further reliably prevent the damage of the window member 44. Further, the third line L3 intersects the third wall portion 53 and the fourth line L4 intersects the fourth wall portion 54. Accordingly, since both the third wall portion 53 and the fourth wall portion 54 facing each other are formed to be thicker than the window member 44, it is possible to support the window member 44 by the thick wall portions 53 and 54 and to further reliably prevent the damage of the window member 44.

The wiring portion 70 extends inside the base 42 so as to overlap the third wall portion 53 when viewed from the Z-axis direction in the overlapping region R2. When the wiring portion 70 is to be pulled out toward the thick third wall portion 53, the above-described deterioration of the wiring portion 70 is likely to occur. However, in the mirror unit 100, since the wiring portion 70 is formed inside the base 42, deterioration of the wiring portion 70 or the like can be reliably prevented.

A distance C1 between the optical scanning device 1 and the third wall portion 53 is longer than a distance C2 between the optical scanning device 1 and the fourth wall portion 54 and the inner electrode pad 71 is disposed between the optical scanning device 1 and the third wall portion 53 on the base 42. Accordingly, it is possible to ensure a space for disposing the inner electrode pad 71.

The wiring portion 70 is electrically connected to the optical scanning device 1 in the inner region R1 located at the inside of the frame member 43 when viewed from the Z-axis direction, extends inside the base 42 in the overlapping region R2 overlapping the frame member 43 when viewed from the Z-axis direction, and leads out to the outer region R3 located at the outside of the frame member 43 when viewed from the Z-axis direction. Accordingly, it is possible to further reliably prevent deterioration of the wiring portion 70 or the like.

The wiring portion 70 does not include a portion formed on the rear surface 42b of the base 42. When the rear surface 42b of the base 42 is fixed to an upper surface of a magnet (a magnetic field generating unit) by adhering, it is preferable that the base 42 be as close as possible to the magnet in order to ensure magnetic force acting on the first drive coil 11 and the second drive coil 12. Since the wiring portion 70 does not include a portion formed on the rear surface 42b of the base 42, the base 42 can be close to the magnet and hence large magnetic force acting on the first drive coil 11 and the second drive coil 12 can be ensured.

Modified Example

In a wiring portion 70A illustrated in FIG. 6, the outer electrode pad 72 and the wiring 73 are provided in the inner region R1. The outer electrode pad 72 is disposed on the rear surface 42b of the base 42 in the inner region R1. The wiring 73 is connected to the rear surface of the inner electrode pad 71, extends inside the base 42 in a linear shape in the Z-axis direction, and is connected to the rear surface of the outer electrode pad 72. Also in such a modified example, deterioration of the wiring portion 70 or the like can be prevented similarly to the above-described embodiment.

In the modified example, the outer electrode pad 72 may be disposed on the rear surface 42b of the base 42 in the outer region R3. In this case, the wiring 73 may include a first portion which is connected to the rear surface of the inner electrode pad 71, extends inside the base 42 in a linear shape in the Z-axis direction, and is exposed to the rear surface 42b of the base 42 and a second portion which is connected to the first portion, is provided on the rear surface 42b so as to extend over the inner region R1, the overlapping region R2, and the outer region R3, and is connected to the outer electrode pad 72.

In the modified example, the outer electrode pad 72 may be disposed on the main surface 42a of the base 42 in the outer region R3. In this case, the wiring 73 may include a first portion which is connected to the rear surface of the inner electrode pad 71, extends inside the base 42 in a linear shape in the Z-axis direction, and is exposed to the rear surface 42b of the base 42, a second portion which is connected to the first portion and is provided on the rear surface 42b so as to extend over the inner region R1, the overlapping region R2, and the outer region R3, and a third portion which is connected to the second portion, extends inside the base 42 in a linear shape in the Z-axis direction, and is connected to the rear surface of the outer electrode pad 72.

The present disclosure is not limited to the embodiment and the modified example above. For example, the materials and shapes of the components are not limited to the materials and shapes described above and various materials and shapes can be adopted. The thicknesses T51 to T54 of the wall portions 51 to 54 may be different from each other. The wiring 73 may be electrically connected to the inner electrode pad 71 in the inner region R1, extend inside the base 42 in the overlapping region R2, and lead out to the outer region R3 and a part of the wiring 73 may be configured as a surface wiring formed along the surface of the base 42. In the optical scanning device 1 of the embodiment, the movable portion 10 is driven by the electromagnetic force, but the movable portion 10 may be driven by an electrostatic force or a piezoelectric element.

In the above-described embodiment, the third wall portion 53 can be regarded as a first reference wall portion and the fourth wall portion 54 can be regarded as a second reference wall portion. In this case, the third wall portion 53, the third end P3, the third side surface 44e, the third corner portion 63, and the third line L3 respectively correspond to the first wall portion, the first end, the first side surface, the first corner portion, and the first line and the fourth wall portion 54, the fourth end P4, the fourth side surface 44f, the fourth corner portion 64, and the fourth line L4 respectively correspond to the second wall portion, the second end, the second side surface, the second corner portion, and the second line. In the above-described embodiment, the third wall portion 53 can be regarded as the second reference wall portion and the fourth wall portion 54 can be regarded as the third reference wall portion.

In the above-described embodiment, the first wall portion 51 can be regarded as the first reference wall portion and the second wall portion 52 can be regarded as the second reference wall portion. In this case, the first wall portion 51, the first end P1, the first side surface 44c, the first corner portion 61, and the first line L1 respectively correspond to the first wall portion, the first end, the first side surface, the first corner portion, and the first line and the second wall portion 52, the second end P2, the second side surface 44d, the second corner portion 62, and the second line L2 respectively correspond to the second wall portion, the second end, the second side surface, the second corner portion, and the second line. In this case, the distance between the optical scanning device 1 and the first wall portion 51 may be longer than the distance between the optical scanning device 1 and the second wall portion 52 and the inner electrode pad 71 may be disposed between the optical scanning device 1 and the first wall portion 51 on the base 42. That is, the inner electrode pad 71 may be disposed between the optical scanning device 1 and the first wall portion 51 distant from the optical scanning device 1 in the first wall portion 51 and the second wall portion 52. Also in this case, it is possible to ensure a space for disposing the inner electrode pad 71. Further, since the first wall portion 51 is separated from the optical scanning device 1 compared to the second wall portion 52, it is possible to prevent the light reflected by the mirror surface 7a from being interrupted by the first wall portion 51 higher than the second wall portion 52. In the above-described embodiment, the first wall portion 51 can be regarded as the second reference wall portion and the second wall portion 52 can be regarded as the first reference wall portion.

In the above-described embodiment, all of the conditions (1) to (4) below are met. However, at least one of the conditions (1) to (4) below may be met and the others may not be met.

(1) In the cross-section of FIG. 2, the first line L1 intersects the first wall portion 51.
(2) In the cross-section of FIG. 2, the second line L2 intersects the second wall portion 52.
(3) In the cross-section of FIG. 3, the third line L3 intersects the third wall portion 53.
(4) In the cross-section of FIG. 3, the fourth line L4 intersects the fourth wall portion 54.

The window member 44 may be provided with a notch. The notch may be formed in, for example, the outer surface 44a and may extend along the edge portion of the outer surface 44a. The notch may be formed in, for example, a rectangular cross-sectional shape. In this case, the window member 44 includes a first corner portion formed at the side of the first wall portion 51 by the outer surface 44a and the inner surface of the notch, a second corner portion formed at the side of the second wall portion 52 by the outer surface 44a and the inner surface of the notch, a fifth corner portion (another first corner portion) formed by the inner surface of the notch and the first side surface 44c, and a sixth corner portion (another second corner portion) formed by the inner surface of the notch and the second side surface 44d in the cross-section of FIG. 2. Further, the window member 44 includes a third corner portion formed at the side of the third wall portion 53 by the outer surface 44a and the inner surface of the notch, a fourth corner portion formed at the side of the fourth wall portion 54 by the outer surface 44a and the inner surface of the notch, a seventh corner portion (another third corner portion) formed by the inner surface of the notch and the third side surface 44e, and an eighth corner portion (another fourth corner portion) formed by the inner surface of the notch and the fourth side surface 44f in the cross-section of FIG. 3. In this case, at least one of the conditions (5) to (8) below may be met. (5) In the cross-section of FIG. 2, a line passing through the first corner portion and the first end P1 at the side of the first wall portion 51 in the mirror surface 7a intersects the first wall portion 51. (6) In the cross-section of FIG. 2, a line passing through the second corner portion and the second end P2 at the side of the second wall portion 52 in the mirror surface 7a intersects the second wall portion 52. (7) In the cross-section of FIG. 3, a line passing through the third corner portion and the third end P3 at the side of the third wall portion 53 in the mirror surface 7a intersects the third wall portion 53. (8) In the cross-section of FIG. 3, the fourth line L4 passing through the fourth corner portion and the fourth end P4 at the side of the fourth wall portion 54 in the mirror surface 7a may intersect the fourth wall portion 54. Accordingly, similarly to the above-described embodiment, each of the wall portions 51 to 54 can be formed to be thick. At least one of the conditions (9) to (12) below may be met. (9) In the cross-section of FIG. 2, a line passing through the first end P1 and the fifth corner portion intersects the first wall portion 51. (10) In the cross-section of FIG. 2, a line passing through the second end P2 and the sixth corner portion intersects the second wall portion 52. (11) In the cross-section of FIG. 3, a line passing through the third end P3 and the seventh corner portion intersects the third wall portion 53. (12) In the cross-section of FIG. 3, a line passing through the fourth end P4 and the eighth corner portion intersects the fourth wall portion 54. Also in this condition, each of the wall portions 51 to 54 can be formed to be thick. When the conditions (9) to (12) above are met, the conditions (5) to (8) above may not be met. In this case, since the conditions (9) to (12) above are met, each of the wall portions 51 to 54 can be formed to be thick. Further, since the conditions (5) to (8) above are not met, it is possible to prevent the light reflected by the mirror surface 7a from being interrupted by each of the wall portions 51 to 54 and to use the entire outer surface 44a of the window member 44 for optical scanning. The outer surface 44a of the window member 44 means a surface facing the side opposite to the optical scanning device 1 and includes the inner surface of the notch.

What is claimed is:

1. A mirror unit comprising:
   a base;
   an optical scanning device that includes a movable portion and a mirror surface provided on the movable portion and is disposed on the base;
   a frame member disposed on the base so as to surround the optical scanning device when viewed from a first direction;
   a window member formed in a plate shape and disposed on the frame member so as to cover an opening of the frame member; and
   a wiring portion electrically connected to the optical scanning device,
   wherein the frame member includes a first wall portion and a second wall portion which face each other in a second direction perpendicular to the first direction and a third wall portion and a fourth wall portion which face each other in a third direction perpendicular to both the first direction and the second direction,
   wherein a height of the first wall portion is higher than a height of the second wall portion,
   wherein the window member is disposed on a top surface of the first wall portion and a top surface of the second wall portion and is inclined with respect to the mirror surface,
   wherein when any one of the first wall portion, the second wall portion, the third wall portion, and the fourth wall portion is set as a first reference wall portion, in a cross-section passing through the mirror surface and perpendicular to the first reference wall portion, a first line passing through a first end at a side of the first reference wall portion in the mirror surface and a first corner portion formed at the side of the first reference wall portion by an outer surface opposite to the frame member and a first side surface in the window member intersects the first reference wall portion,
   wherein the wiring portion includes a portion extending inside the base and leads outside the frame member,
   wherein the wiring portion includes one or more electrode pads provided on the base in a region between the frame member and the optical scanning device when viewed from the first direction, and
   wherein more of the electrode pads are disposed in a region between the optical scanning device and any one of the first wall portion, the third wall portion, and the fourth wall portion than in a region between the optical scanning device and the second wall portion.

2. The mirror unit according to claim 1,
   wherein the window member is bonded to the frame member, and
   wherein a thickness of the window member is smaller than a width of a region in which the window member and the frame member are bonded to each other.

3. The mirror unit according to claim 1,
   wherein when one facing the first reference wall portion among the first wall portion, the second wall portion, the third wall portion, and the fourth wall portion is set as a second reference wall portion, in the cross-section, a second line passing through a second end at a side of the second reference wall portion in the mirror surface and a second corner portion formed at the side of the second reference wall portion by the outer surface and a second side surface in the window member intersects the second reference wall portion.

4. The mirror unit according to claim 1,
   wherein the wiring portion extends inside the base so as to overlap the first reference wall portion when viewed from the first direction.

5. The mirror unit according to claim 1,
   wherein when one facing the first reference wall portion among the first wall portion, the second wall portion, the third wall portion, and the fourth wall portion is set as a second reference wall portion, a distance between the optical scanning device and the first reference wall portion is longer than a distance between the optical scanning device and the second reference wall portion, and
   wherein the one or more electrode pads are disposed between the optical scanning device and the first reference wall portion on the base.

6. The mirror unit according to claim 5,
   wherein the first reference wall portion is the first wall portion and the second reference wall portion is the second wall portion.

7. The mirror unit according to claim 1,
   wherein the wiring portion is electrically connected to the optical scanning device in a first region located at an inside of the frame member when viewed from the first direction, extends inside the base in a second region overlapping the frame member when viewed from the first direction, and leads out to a third region located at an outside of the frame member when viewed from the first direction.

8. The mirror unit according to claim 1,
   wherein the frame member is bonded to the base by a bonding material.

9. A mirror unit comprising:

a base;

an optical scanning device that includes a movable portion and a mirror surface provided on the movable portion and is disposed on the base;

a frame member disposed on the base so as to surround the optical scanning device when viewed from a first direction;

a window member formed in a plate shape and disposed on the frame member so as to cover an opening of the frame member; and a wiring portion electrically connected to the optical scanning device, wherein the frame member includes a first wall portion and a second wall portion which face each other in a second direction perpendicular to the first direction and a third wall portion and a fourth wall portion which face each other in a third direction perpendicular to both the first direction and the second direction, wherein a height of the first wall portion is higher than a height of the second wall portion, wherein the window member is disposed on a top surface of the first wall portion and a top surface of the second wall portion and is inclined with respect to the mirror surface, wherein the wiring portion includes one or more electrode pads provided on the base in a region between the frame member and the optical scanning device when viewed from the first direction, and wherein more of the electrode pads are disposed in a region between the optical scanning device and any one of the first wall portion, the third wall portion, and the fourth wall portion than in a region between the optical scanning device and the second wall portion.

* * * * *